US010544680B2

(12) United States Patent
Döbbeling et al.

(10) Patent No.: US 10,544,680 B2
(45) Date of Patent: Jan. 28, 2020

(54) LAST TURBINE ROTOR DISK FOR A GAS TURBINE, ROTOR FOR A GAS TURBINE COMPRISING SUCH LAST TURBINE ROTOR DISK AND GAS TURBINE COMPRISING SUCH ROTOR

(71) Applicant: ANSALDO ENERGIA SWITZERLAND AG, Baden (CH)

(72) Inventors: Klaus Döbbeling, Windisch (CH); Gerard Dusomos, Hendschiken (CH); Jose Anguisola McFeat, Lauchringen (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 110 days.

(21) Appl. No.: 15/856,269

(22) Filed: Dec. 28, 2017

(65) Prior Publication Data

US 2018/0187550 A1    Jul. 5, 2018

(30) Foreign Application Priority Data

Dec. 30, 2016    (EP) .................................... 16207650

(51) Int. Cl.
*F01D 5/08*    (2006.01)
*F02C 7/18*    (2006.01)
(Continued)

(52) U.S. Cl.
CPC ............... *F01D 5/081* (2013.01); *F01D 5/06* (2013.01); *F02C 7/18* (2013.01); *F02C 7/24* (2013.01);
(Continued)

(58) Field of Classification Search
CPC . F01D 5/081; F01D 5/06; F01D 5/082; F02C 7/24; F02C 9/18
See application file for complete search history.

(56) References Cited

U.S. PATENT DOCUMENTS 5,507,620 A    4/1996  Primoschitz et al.
6,155,040 A   12/2000  Sasaki
(Continued)

FOREIGN PATENT DOCUMENTS

EP        0 894 942 A2     2/1999
WO    WO 2016/031475 A1    3/2016
WO    WO-2016031475 A1 *   3/2016  ............... F01D 5/08

OTHER PUBLICATIONS

European Search Report for EP 16207650.9 dated Dec. 30, 2016.

*Primary Examiner* — Woody A Lee, Jr.
(74) *Attorney, Agent, or Firm* — Buchanan Ingersoll & Rooney PC (57) ABSTRACT

A gas turbine having a compressor section provided with a plurality of compressor blades and vanes for compressing air; a combustion section; a turbine section a rotor having an axis and extending from a compressor section to the turbine section for supporting the compressor and turbine blades, the rotor having a last rotor disk having a downstream portion for supporting a bearing cover and an upstream portion for supporting a last turbine blade; and a cooling duct system configured for supplying cooling air from a downstream end of the turbine section to the last turbine blade passing inside the last rotor disk, and having an axial bore in the downstream portion of the last rotor disk along the rotor axis; and a first plurality of inclined radial bores in the upstream portion of the last rotor disk off the axis.

14 Claims, 5 Drawing Sheets (51) Int. Cl.
*F02C 9/18* (2006.01)
*F02C 7/24* (2006.01)
*F01D 5/06* (2006.01)
F04D 19/02 (2006.01)
F02C 3/04 (2006.01)

(52) U.S. Cl.
CPC .............. *F02C 9/18* (2013.01); *F02C 3/04* (2013.01); *F04D 19/02* (2013.01); *F05D 2220/32* (2013.01); *F05D 2240/12* (2013.01)

(56) References Cited

U.S. PATENT DOCUMENTS

| | | | |
|---|---|---|---|
| 6,293,089 B1 | 9/2001 | Sasaki | |
| 7,993,102 B2 | 8/2011 | Desai et al. | |
| 2005/0169749 A1* | 8/2005 | Coulon | F01D 11/025 |
| | | | 415/170.1 |
| 2005/0201857 A1* | 9/2005 | Ferra | F01D 5/082 |
| | | | 415/115 |
| 2009/0324386 A1 | 12/2009 | Takamura et al. | |
| 2012/0060509 A1* | 3/2012 | Myoren | F01D 5/085 |
| | | | 60/785 |
| 2013/0017059 A1* | 1/2013 | Wu | F01D 5/08 |
| | | | 415/1 |
| 2013/0156598 A1* | 6/2013 | Davis | F01D 5/082 |
| | | | 416/96 R |
| 2013/0251941 A1* | 9/2013 | Garry | C23C 30/00 |
| | | | 428/138 |
| 2015/0354465 A1* | 12/2015 | Suciu | F02C 3/04 |
| | | | 60/782 |
| 2017/0234135 A1 | 8/2017 | Takamura et al. | |

* cited by examiner

LAST TURBINE ROTOR DISK FOR A GAS TURBINE, ROTOR FOR A GAS TURBINE COMPRISING SUCH LAST TURBINE ROTOR DISK AND GAS TURBINE COMPRISING SUCH ROTOR

PRIORITY CLAIM

This application claims priority from European Patent Application No. 16207650.9 filed on Dec. 30, 2016, the disclosure of which is incorporated by reference.

FIELD OF THE INVENTION

The present invention relates to a last turbine rotor disk for a gas turbine, to a rotor for a gas turbine comprising such last turbine rotor disk and to a gas turbine comprising such rotor. In particular, the present invention relates to a last turbine rotor disk for a gas turbine provided with a cooling duct system configured for cooling the last and/or the second last turbine blades with cooling air coming from the turbine downstream end.

DESCRIPTION OF PRIOR ART

A gas turbine power plant (in the following only gas turbine) comprises a rotor provided with an upstream compressor, at least a combustion chamber and at least a downstream turbine. The terms "downstream" and "upstream" refer to the direction of the main gas flow passing through the gas turbine from the compressor to the turbine. The terms "inner/inwardly" and "outer/outwardly" refer to the distance from the turbine axis. In particular, the compressor comprises an inlet supplied with air and a plurality of blades and vanes configured for compressing the air entering the compressor. The compressed air leaving the compressor flows into a plenum and from there into a burner. Inside the burner, the compressed air is mixed with at least one fuel. The mixture of such fuel and the compressed air flows into a combustion chamber where this mixture is combusted. The resulting hot gas leaves the combustor chamber and expands in the turbine performing work on the rotor. In particular, the turbine comprises a plurality of turbine blade stages separated by a plurality of turbine vane stages wherein each turbine blade stage comprises a plurality of radial blades adjacent arranged along a circumferential direction centered in the rotor axis.

In order to avoid overheating during operation and consequently to avoid reduction of the service life of the implant, the majority of the components of the gas turbine are actively cooled by cooling air. This cooling air is supplied from the compressor or from an external cooling source to a cooling duct system realized inside the rotor that is in fluidly connection to the rotating gas turbine components to be cooled. Cooling air required for the static parts of the turbine (turbine vanes and stator heat shields) is supplied to a separate system of ducts.

Rotors for gas turbines usually comprise a plurality of disks which are joined together along the rotor axis (that correspond to the gas turbine central axis) by means of bolted connections or they are welded together. The geometrical form of the disks leads to the formation of radial cavities between the respectively adjacent disks.

Referring to the cooling duct system configured for cooling the turbine first and second blade stages, according to the prior art, such cooling duct system comprises an axial annulus supplied by cooling air coming from the compressor connected to the radial cavities of the first (or upstream) turbine stages. In case of a turbine having four blade rows, the upstream cooling supply system is connected to the first and to the second turbine blade row so the cooling air coming from the compressor is supplied to the first turbine stage by bores starting from an outer portion of the first radial cavity. Subsequently the cooling air is supplied underneath the first rotor heat shield to the second blade row of the turbine. This cooling duct system for cooling the first and the second turbine stage is, for instance, disclosed in U.S. Pat. No. 7,993,102. In order to cool the last (or downstream) and the second last turbine stage, according to the prior art the cooling duct system comprise an axial bore passing to the entire length of the last rotor disk for supplying cooling air form the downstream end of the turbine to the last turbine radial cavity between the last and the second last rotor disk as disclosed in U.S. Pat. No. 5,507,620. From this last turbine radial cavity, the cooling air is supplied to the second last turbine blade row by means of a plurality of radial inclined bores. From the root of the second last turbine blades the cooling air is in part deviated to the heat shield facing the last turbine vane row and then it arrived at the root of the last turbine blades. As known, the cooling air flows inside the turbine blades from the root to the tip before exiting the blades.

Taking in the consideration the foregoing described existing solution, there is a still need for an efficient cooling system especially of the last two turbine blade rows. Moreover, the axial bore, in particular the portion of the axial bore underneath the last turbine blade row, has the disadvantage that the centrifugal load generated during the use of the turbine has to be carried by the hoop stresses at the outer diameter of the axial bore. Consequently, the centrifugal load carrying capability is limited by the presence of such axial bore.

DISCLOSURE OF THE INVENTION

Accordingly, a primary object of the present invention is to provide a last turbine rotor disk for a gas turbine suitable for overcoming the foregoing described drawbacks of the prior art.

In order to achieve the objective mentioned above, the present invention provides a gas turbine comprising in series along a main hot gas direction the following sections:
- a compressor section provided with a plurality of compressor blades and vanes for compressing air;
- a combustion section for realizing a mixture of the compressed air and a fuel and for burning the mixture;
- a turbine section provided with a plurality of turbine blades and vanes for allowing the expansion of the burnt mixture.

The gas turbine moreover comprises a rotor having an axis and extending from the compressor section to the turbine section for supporting the compressor and the turbine blades. The rotor is made of a plurality of independent rotor disks adjacent arranged along the rotor axis and shaped for realizing cavities between the respectively adjacent disks. In particular, the rotor comprises a last, or downstream, rotor disk having a downstream portion for supporting a bearing cover and an upstream portion for supporting a last turbine blade. The bearing cover realizes the lower surface of the exhaust diffusor for the hot gas leaving the turbine and is supported by the downstream portion of the last rotor disk through a bearing.

The gas turbine is provided with a cooling duct system configured for supplying cooling air from a downstream end of the turbine section to the last turbine blade (and/or the second last turbine blade) passing inside the last rotor disk.

According the general aspect of the invention, the cooling duct system comprises an axial bore realized in the downstream portion of the last rotor disk along the rotor axis and a first plurality of inclined radial bores in the upstream portion of the last rotor disk off the rotor axis. The definition "inclined radial" means that the first bores start in an inner position of the last rotor disk near to the rotor axis (indeed the first inclined radial bores start at the end of the axial bore located along the axis) and that the first bores end in an outer position with respect to the rotor axis. Indeed, as will be explained in the following, according to some embodiments of the invention, the first inclined radial bores end at the root of the last blade or at the last heat shield or at the upper portion of the radial cavity between the last and the second last rotor disk. As for the prior art practice, the axial bore starts from the downstream portion of the last rotor disk. However, contrary to the prior art practice and according the invention, the axial bore ends before the last radial cavity between the last and the second last disk. In particular the axial bore ends does not exceed the portion of the last disk that supports the bearing cover.

Advantageously, according to the general aspect of the invention as foregoing described, under the last blade the center of the last disk is not provided with any axial bore and therefore the centrifugal load carrying capability of the last rotor disk is improved.

According to an embodiment of the invention, the first plurality of inclined radial bores realized in the upstream portion of the last rotor disk off the rotor axis is extending from the end of axial bore to a root portion of the last turbine blade. From the root, the cooling air reaches the blade tip in a known manner.

According to an embodiment of the invention, the first plurality of inclined radial bores realized in the upstream portion of the last rotor disk off the rotor axis is extending from the end of axial bore to a last heat shield arranged upstream the last turbine blade and fluidly connected to the last turbine blade. The fluidly connection between the last heat shield and the root of the last turbine blade can be realized according the prior art practice.

According to an embodiment of the invention, the first plurality of inclined radial bores realized in the upstream portion of the last rotor disk off the rotor axis is extending from the end of the axial bore to a last radial cavity arranged under the last heat shield and fluidly connected to the last turbine blade. The fluidly connection between the last radial cavity and the root of the last turbine blade can be realized according the prior art practice. Indeed, the last radial cavity can be fluidly connected to a root portion of a second last turbine blade in turn fluidly connected the last turbine blade through the last heat shield. Alternatively or complementary, the last radial cavity can be fluidly connected to a second last heat shield (upstream the second last turbine blade) fluidly connected to a second last turbine blade in turn fluidly connected the last turbine blade through the last heat shield.

According to these embodiments wherein the first inclined radial bores realized in the upstream portion of the last rotor disk end at the last radial cavity, the gas turbine comprises a plurality of additional inclined radial bores realized in the second last turbine disk starting from the last radial cavity off the axis.

Preferably, the number of such additional inclined radial bores starting from the last radial cavity is greater than the inclined radial bores realized in the last turbine disk.

According to an embodiment of the invention, the cooling duct system comprises an second plurality of inclined radial bores realized in the last turbine disk for directly supplying cooling air coming from a bore realized inside the bearing cover to the last heat shield fluidly connected the last turbine blade. This second plurality of inclined radial bores is outer arranged and substantially parallel with respect to the first plurality of inclined radial bores.

As known, the gas turbine can comprise a compressor for supplying the cooling air in the cooling duct system or the gas turbine can comprise a by-pass system for supplying compressed air leaving the compressor section to the cooling duct system.

The last rotor disk provided with the first and optionally with the second inclined radial bores has been described as integrated in the relative gas turbine. However, the present invention relates also directly to such last rotor disk as spare part.

It is to be understood that both the foregoing general description and the following detailed description are exemplary, and are intended to provide further explanation of the invention as claimed. Other advantages and features of the invention will be apparent from the following description, drawings and claims.

The features of the invention believed to be novel are set forth with particularity in the appended claims.

BRIEF DESCRIPTION OF DRAWINGS

Further benefits and advantages of the present invention will become apparent after a careful reading of the detailed description with appropriate reference to the accompanying drawings.

The invention itself, however, may be best understood by reference to the following detailed description of the invention, which describes an exemplary embodiment of the invention, taken in conjunction with the accompanying drawings, in which.

DETAILED DESCRIPTION OF PREFERRED EMBODIMENTS OF THE INVENTION

In cooperation with attached drawings, the technical contents and detailed description of the present invention are described thereinafter according to preferred embodiments, being not used to limit its executing scope. Any equivalent variation and modification made according to appended claims is all covered by the claims claimed by the present invention.

Reference will now be made to the drawing figures to describe the present invention in detail.

Figure 1:
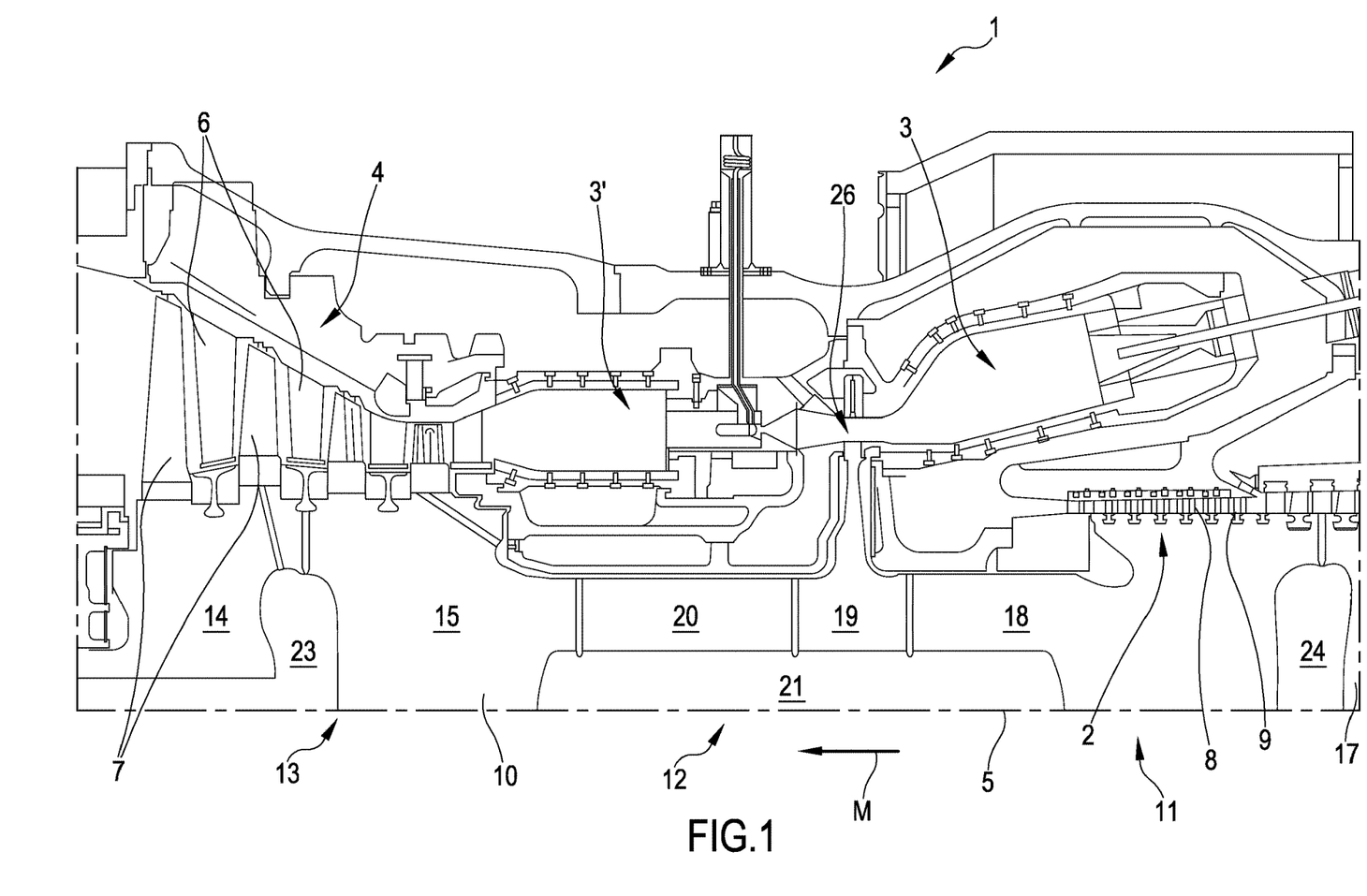
FIG. 1 is a schematic view of a cross section of one half of a gas turbine according to the prior art.

Reference is made to FIG. 1 that is a schematic view of a cross section of one half of a gas turbine according to the prior art. This gas turbine 1 comprises a compressor section 2, a combustion section 3, in particular a sequential combustion section 3 3' divided by a high pressure turbine 26, and a turbine section 4, in particular a low pressure turbine section 4. The compressor section 2 inducts and pressurized inlet air, which is directed to the combustor section 3. Part of this pressurized air can be used for cooling of the different parts of the gas turbine 1, such as the first turbine blade rows. As shown in FIG. 1, the gas turbine 1 has a rotor 10 that can rotate about its central axis 5. The rotor 10 is arranged centrally in a housing to which a number of turbine stator vanes 6 and compressor stator vanes 8 are fitted. Corresponding to this, the rotor 10 is fitted with a number of rotor blades, namely turbine blade 7 and compressor blade 9.

Figures 2, 3:
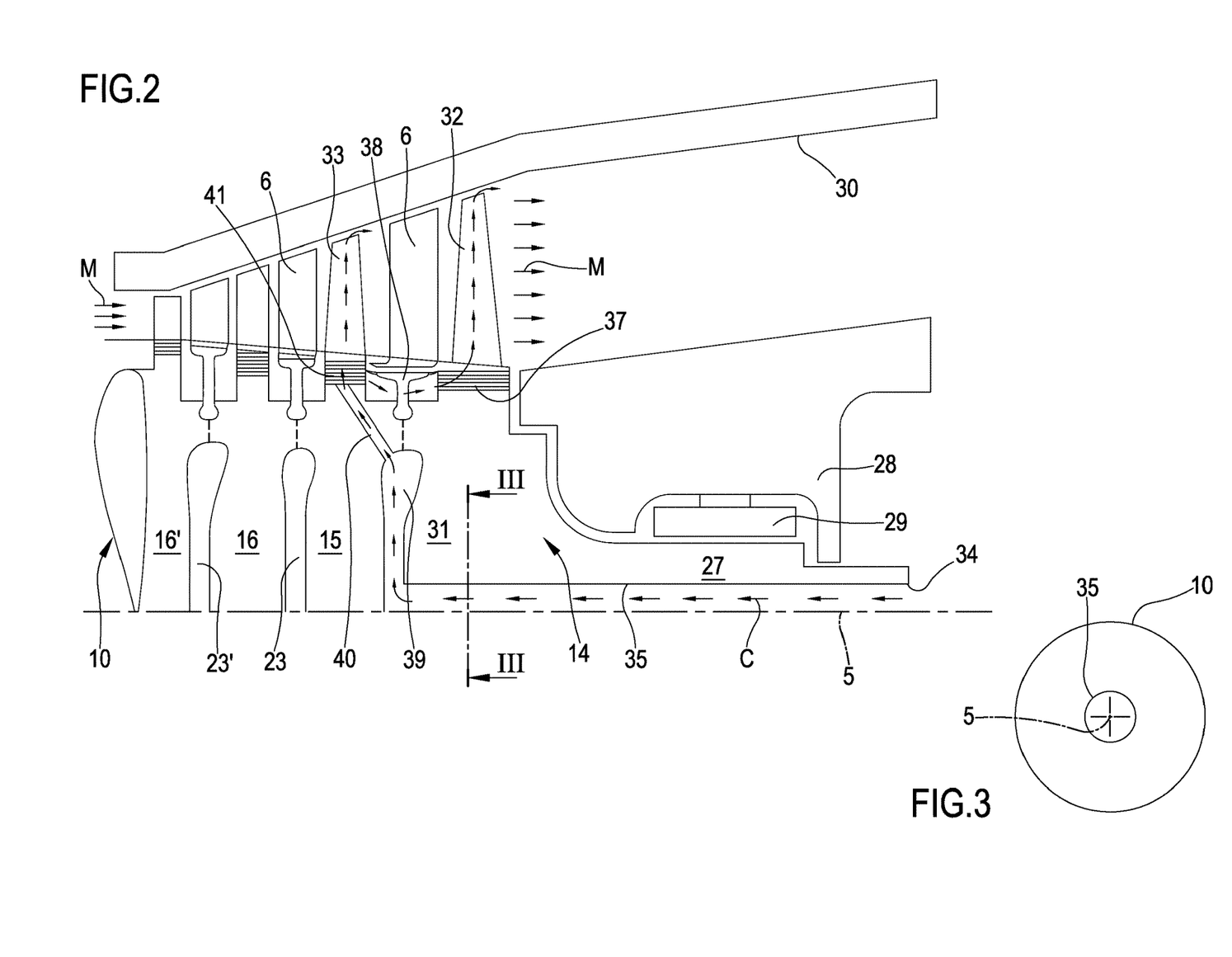
FIG. 2 is a schematic enlarged view of a cross section of the last two turbine stages provided with a cooling duct system according to the prior art.
FIG. 3 is a partial schematic view of a cross section of the last rotor disk of FIG. 2 along the section line IV-IV.

In the embodiment of FIG. 1, the rotor 10 comprises a plurality of rotor disks 14 15 arranged one behind the other along the rotor axis 5 and connected to one another. In general, the rotor disks could be bolted or welded together. The rotor 10 extends from a compressor part 11 to a turbine part 13 and has a central part 12 between the compressor part 11 and the turbine part 13. In the example of FIG. 2, the turbine part 13 comprises two turbine disks namely a first or upstream disk 15, and a last or downstream disk 14. Of course, the turbine can comprise more than two disks 14, 15, 16, 16'. For instance the FIG. 3 discloses a turbine provided with four turbine disks. Also the compressor part comprises a plurality of compressor disks 17-18, and the central part is realized in form of a rotor drums 19, 20 around a central cavity 21. The geometrical form of the disks leads to the formation of radial cavities between the respectively adjacent disks. For instance, at the turbine part 13 the radial cavities extend radially from the axis 5 to the heat shield facing a rotor vanes. For example, the turbine disks 15 and 14 create the cavity 23 between them, while compressor disks 17 and 18 create the cavity 24.

Reference is made to FIG. 2 that is a schematic enlarged view of a cross section of the last two turbine stages provided with a cooling duct system according to the prior art. The embodiment of FIG. 2 discloses a turbine section of a gas turbine comprising four rotating blades, in particular a last or downstream blade 32 and a second last turbine blade 33, supported by a rotor 10. The rotor 10 is realized by a plurality of adjacent rotor disk, in particular the last rotor disk 14 supporting the last blade 32 and the second last rotor disk 15 supporting the second last blade 33. The blades 32 33 are connected to the relative rotor disk 14 15 at blade roots 37 41. Between the blades 32 33, the gas turbine comprises vanes 6 facing relative heat shields supported by the rotor 10. Under the heat shields are present radial cavities formed during the coupling of the rotor disk. In particular, the last radial cavity 39 is located under the last heat shield 38 facing the relative vane 6. According to the FIG. 2 the last rotor disk 14 comprises a downstream portion 27 that support a bearing 29 and the relative bearing cover 28. The last rotor disk 14 moreover comprises an upstream portion that support the last blade 32. The gas turbine of FIG. 2 is provided with a cooling duct system for supplying cooling air to the two last blades passing inside the last rotor disk 14 and coming from the downstream end 34 of the turbine section. According to this prior art example, the cooling duct system comprises an axial duct passing the entire length of the last rotor disk along the turbine axis and ending at the last radial cavity 39. The second last disk 15 is provided with a plurality of inclined radial bores 40 starting from the last radial cavity 39 and ending at the root 41 of the second last blade 33. From such root 41 part of the cooling air enters the second last blade 33 whereas the remaining part flows in the last heat shield 38 and arrives to the root 37 of the last blade 32. The arrows C refer to the cooling air and the arrows M the main hot gas flow.

Reference is made to FIG. 3 that is a partial schematic view of a cross section of the last rotor disk of FIG. 2 along the section line IV-IV. This figure disclose that under the last blade 32 according the prior art the last rotor disk 14 is provided with an axial bore 35 aligned with the turbine axis 5.

Figures 4, 5:
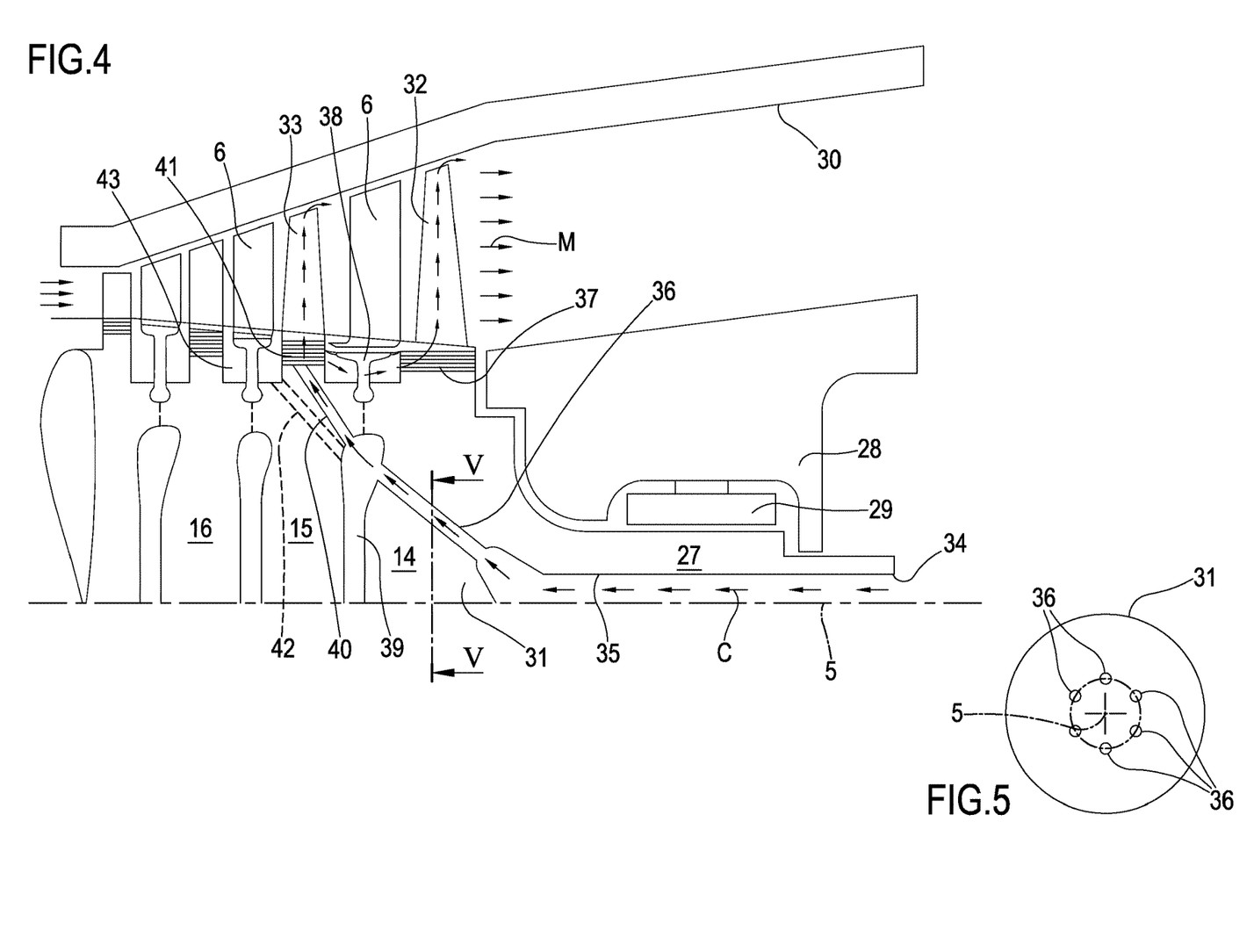
FIG. 4 is a schematic enlarged view of a cross section of the last two turbine stages provided with a cooling duct system according to a first embodiment of the invention.
FIG. 5 is a partial schematic view of a cross section of the last rotor disk of FIG. 4 along the section line VI-VI.

Reference is made to FIG. 4 that is a schematic enlarged view of a cross section of the last two turbine stages provided with a cooling duct system according to a first embodiment of the invention. In FIG. 4 the axial bore 35 ends before the upstream portion 31 of the last rotor disk 14 that support the last blade 32. In particular the axial bore 35 does not exceed the downstream portion 27 of the last rotor disk 14 that support the bearing cover 28. According to this embodiment of the invention the upstream portion 31 of the last rotor disk 14 that support the last blade 32 is provided with a first plurality of inclined radial bores 36 starting from the axial bore 35 and ending at the last radial cavity 39. From the last radial cavity 39 the cooling air can be supplied as disclosed in FIG. 2 to the root 41 of the second last blade 33 or to the second heat shield connected to the second last blade 33.

Reference is made to FIG. 5 that is a partial schematic view of a cross section of the last rotor disk of FIG. 4 along the section line VI-VI. According to this figure, the center of the upstream portion 31 last rotor disk 14 at the rotor axis 5 is not provided with any axial center bore. On the contrary, the upstream portion 31 last rotor disk 14 is provided with the first plurality of inclined radial bores 36 circumferentially arranged around the rotor axis 5.

Figures 6, 7:
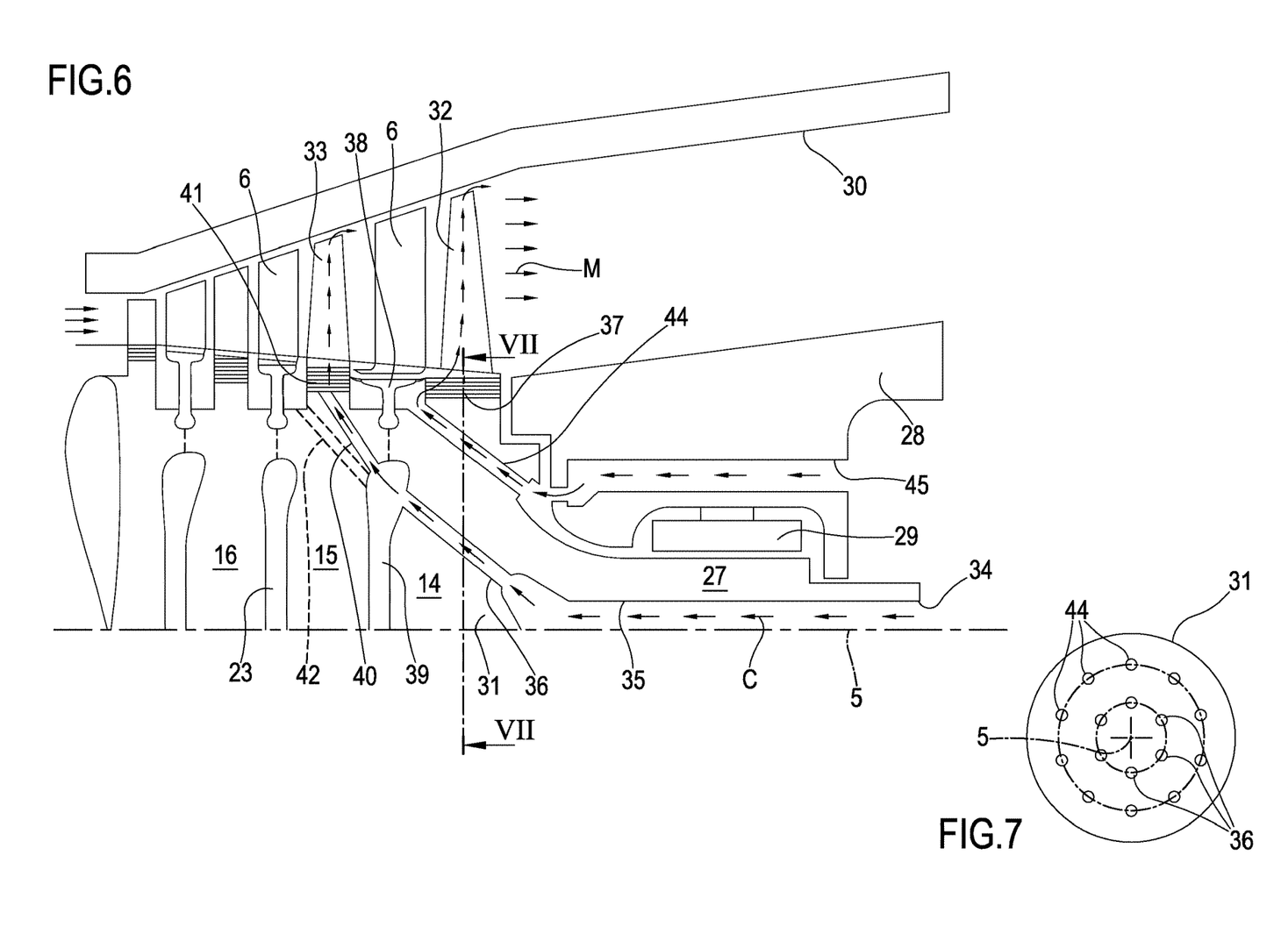
FIG. 6 is a schematic enlarged view of a cross section of the last two turbine stages provided with a cooling duct system according to a second embodiment of the invention.
FIG. 7 is a partial schematic view of a cross section of the last rotor disk of FIG. 6 along the section line VIII-VIII.

Reference is made to FIG. 6 that is a schematic enlarged view of a cross section of the last two turbine stages provided with a cooling duct system according to a second embodiment of the invention. According to this figure, the last rotor disk 14 is provided with a second plurality of inclined radial bores 44. This second plurality of inclined radial bores 44 connects the last heat shield 38 to a bore 45 realized inside the rotor cover.

Reference is made to FIG. 7 that is a partial schematic view of a cross section of the last rotor disk of FIG. 6 along the section line VIII-VIII. According to this embodiment, the center of the upstream portion 31 last rotor disk 14 at the rotor axis 5 is not provided with any axial center bore. On the contrary, the upstream portion 31 last rotor disk 14 is provided with the first plurality of inner inclined radial bores 36 and a second plurality of outer inclined radial bores 44 circumferentially arranged around the rotor axis 5.

Figures 8, 9:
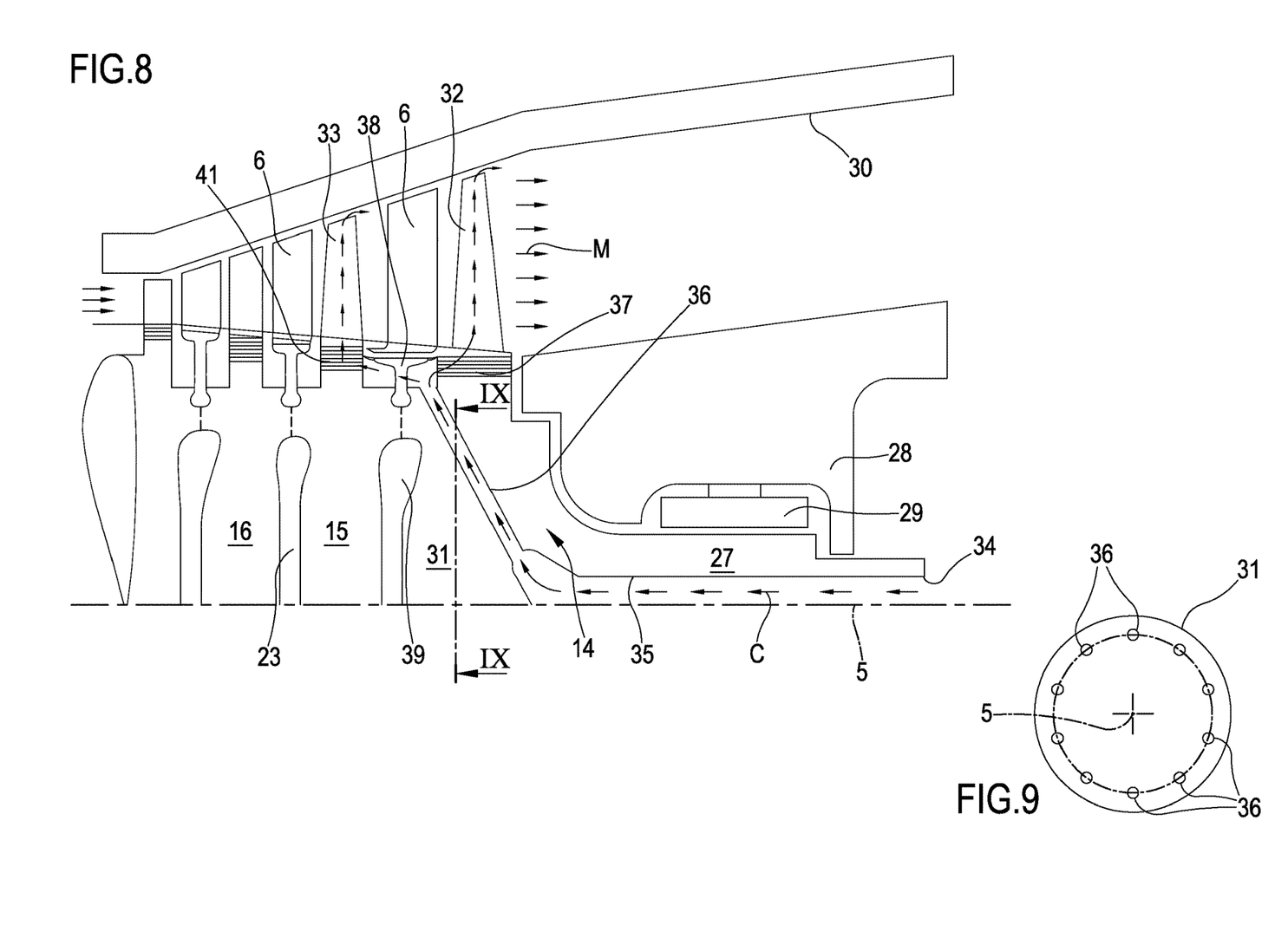
FIG. 8 is a schematic enlarged view of a cross section of the last two turbine stages provided with a cooling duct system according to a third embodiment of the invention.
FIG. 9 is a partial schematic view of a cross section of the last rotor disk of FIG. 8 along the section line X-X.

Reference is made to FIG. 8 that is a schematic enlarged view of a cross section of the last two turbine stages provided with a cooling duct system according to a third embodiment of the invention. According to this figure, the first plurality of inner inclined radial bores 36 ends at the last heat shield 38 and a part of the air enters the last blade 32 and the remaining part enters the second last blade 33.

Reference is made to FIG. 9 that is a partial schematic view of a cross section of the last rotor disk of FIG. 8 along the section line X-X.

According to this figure, the center of the upstream portion 31 last rotor disk 14 at the rotor axis 5 is not provided with any axial center bore. On the contrary, the upstream portion 31 last rotor disk 14 is provided with the first plurality of inclined radial bores 36 circumferentially arranged around the rotor axis 5.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A gas turbine comprising, in series along a main hot gas direction:
    a compressor section provided with a plurality of compressor blades and vanes for compressing air;
    a combustion section for realizing a mixture of the compressed air and a fuel and for burning the mixture;
    a turbine section provided with a plurality of turbine blades and vanes for expanding the burnt mixture;
    a rotor having an axis and extending from the compressor section to the turbine section for supporting the compressor and the turbine blades, the rotor being made of a plurality of rotor disks adjacent arranged along the rotor axis and shaped for realizing cavities between the respectively adjacent disks, the rotor having a last rotor disk having a downstream portion for supporting a bearing cover and an upstream portion for supporting a last turbine blade; and
    a cooling duct system configured for supplying cooling air from a downstream end of the turbine section to the last turbine blade passing inside a last rotor disk;
    wherein the cooling duct system includes:
        an axial bore in the downstream portion of the last rotor disk along the rotor axis;
        a first plurality of inclined radial bores in the upstream portion of the last rotor disk off the rotor axis, wherein the first plurality of inclined radial bores in the upstream portion of the last rotor disk off the rotor axis extends from the axial bore to a last radial cavity arranged under the last heat shield and fluidly connected to the last turbine blade; and
        additional inclined radial bores off the axis in a second last turbine disk extending from the last radial cavity to a root portion of a second last turbine blade in turn fluidly connected the last turbine blade through the last heat shield.

2. The gas turbine as claimed in claim 1, wherein the number of the additional inclined radial bores in the second last turbine disk is greater than the inclined radial bores in the last turbine disk.

3. The gas turbine as claimed in claim 1, wherein the cooling duct system comprises:
    a second plurality of inclined radial bores in the last turbine disk for directly supplying cooling air coming from a bore realized inside the bearing cover to the last heat shield fluidly connected the last turbine blade.

4. The gas turbine as claimed in claim 1, wherein the gas turbine comprises:
    a compressor for supplying the cooling air in the cooling duct system.

5. The gas turbine as claimed in claim 1, wherein the gas turbine comprises:
    a by-pass system for supplying compressed air leaving the compressor section to the cooling duct system.

6. The gas turbine as claimed in claim 1, wherein the cooling duct system comprises:
    additional inclined radial bores off the axis in a second last turbine disk extending from the last radial cavity to a second last heat shield fluidly connected to a second last turbine blade in turn fluidly connected the last turbine blade through the last heat shield.

7. A gas turbine comprising, in series along a main hot gas direction:
    a compressor section provided with a plurality of compressor blades and vanes for compressing air;
    a combustion section for realizing a mixture of the compressed air and a fuel and for burning the mixture;
    a turbine section provided with a plurality of turbine blades and vanes for expanding the burnt mixture;
    a rotor having an axis and extending from the compressor section to the turbine section for supporting the compressor and the turbine blades, the rotor being made of a plurality of rotor disks adjacent arranged along the rotor axis and shaped for realizing cavities between the respectively adjacent disks, the rotor having a last rotor disk having a downstream portion for supporting a bearing cover and an upstream portion for supporting a last turbine blade; and
    a cooling duct system configured for supplying cooling air from a downstream end of the turbine section to the last turbine blade passing inside a last rotor disk;
    wherein the cooling duct system includes:
        an axial bore in the downstream portion of the last rotor disk along the rotor axis;
        a first plurality of inclined radial bores in the upstream portion of the last rotor disk off the rotor axis, wherein the first plurality of inclined radial bores in the upstream portion of the last rotor disk off the rotor axis extends from the axial bore to a last radial cavity arranged under the last heat shield and fluidly connected to the last turbine blade; and
        additional inclined radial bores off the axis in a second last turbine disk extending from the last radial cavity to a second last heat shield fluidly connected to a second last turbine blade in turn fluidly connected the last turbine blade through the last heat shield.

8. The gas turbine as claimed in claim 7, wherein the number of the additional inclined radial bores in the second last turbine disk is greater than the inclined radial bores in the last turbine disk.

9. The gas turbine as claimed in claim 7, wherein the gas turbine comprises:
    a compressor configured to supply the cooling air in the cooling duct system.

10. The gas turbine as claimed in claim 7, wherein the gas turbine comprises:
    a by-pass system configured to supply compressed air leaving the compressor section to the cooling duct system.

11. A rotor disk for a gas turbine, the rotor disk being a last rotor disk among plural rotor disks arranged along a rotor axis, the last rotor disk comprising:
    a downstream portion for supporting a bearing cover; and
    an upstream portion for supporting a last turbine blade in a series of turbine blades; the last rotor disk being provided with a cooling duct system configured for supplying cooling air from a downstream end of the last rotor disk to the last turbine blade passing inside the last rotor disk;

wherein the cooling duct system comprises:
- an axial bore in the downstream portion of the last rotor disk along the rotor axis;
- a first plurality of inclined radial bores in the upstream portion of the last rotor disk off the rotor axis, wherein the first plurality of inclined radial bores in the upstream portion of the last rotor disk off the rotor axis extends from the axial bore to a last radial cavity arranged under the last heat shield and fluidly connected to the last turbine blade; and
- a second plurality of inclined radial bores in the last turbine disk for directly supplying cooling air coming from a bore realized inside the bearing cover to the last heat shield fluidly connected the last turbine blade.

12. The gas turbine as claimed in claim 11, wherein the number of the additional inclined radial bores in the second last turbine disk is greater than the inclined radial bores in the last turbine disk.

13. The gas turbine as claimed in claim 11, wherein the gas turbine comprises:
- a compressor configured to supply the cooling air in the cooling duct system.

14. The gas turbine as claimed in claim 11, wherein the gas turbine comprises:
- a by-pass system configured to supply compressed air leaving the compressor section to the cooling duct system.

* * * * *